(12) United States Patent
Zhu et al.

(10) Patent No.: US 10,981,798 B2
(45) Date of Patent: Apr. 20, 2021

(54) METHOD AND SYSTEM FOR RAPIDLY PREPARING LITHIUM CARBONATE OR CONCENTRATED BRINE USING HIGH-TEMPERATURE STEAM

(71) Applicants: Guangzhou Ruishi Tianqi Energy Technology Co., Ltd., Guangzhou (CN); Binyuan Zhu, Guangzhou (CN)

(72) Inventors: Binyuan Zhu, Guangzhou (CN); Hao Yu, Guangzhou (CN); Fuming Peng, Dongguan (CN); Xiong Zeng, Guangzhou (CN)

(73) Assignees: Guangzhou Ruishi Tianqi Energy Technology Co., Ltd., Guangdong (CN); Binyuan Zhu, Guangdong (CN)

( * ) Notice: Subject to any disclaimer, the term of this patent is extended or adjusted under 35 U.S.C. 154(b) by 368 days.

(21) Appl. No.: 15/770,495

(22) PCT Filed: May 18, 2017

(86) PCT No.: PCT/CN2017/084812
§ 371 (c)(1),
(2) Date: Apr. 23, 2018

(87) PCT Pub. No.: WO2017/202236
PCT Pub. Date: Nov. 30, 2017

(65) Prior Publication Data
US 2019/0055134 A1    Feb. 21, 2019

(30) Foreign Application Priority Data
May 26, 2016   (CN) .......................... 201610364149.7

(51) Int. Cl.
*C01D 15/08*    (2006.01)
*C01D 3/06*    (2006.01)
(Continued)

(52) U.S. Cl.
CPC ............... *C01D 15/08* (2013.01); *B01D 1/14* (2013.01); *B01D 3/38* (2013.01); *B01D 5/0081* (2013.01);
(Continued)

(58) Field of Classification Search
CPC . C01D 15/08; C01D 3/06; B01D 1/14; B01D 3/38; B01D 5/0081; B01D 1/0041;
(Continued)

(56) References Cited

U.S. PATENT DOCUMENTS

2015/0044124 A1\*    2/2015  Tiihonen .................. B01D 9/00
                                                                      423/421

FOREIGN PATENT DOCUMENTS

CN        103657135        \*    8/2012  ............... B01D 9/02
CN        205773394 U      \*   12/2016  ............. C01D 15/08

OTHER PUBLICATIONS

Machine Transation of CN 103657135 to China (Year: 2012).\*
Machine Translation of CN 205773394 U (Year: 2016).\*

\* cited by examiner

*Primary Examiner* — Daniel C. McCracken
(74) *Attorney, Agent, or Firm* — Michael J. Feigin, Esq.; Feigin and Fridman LLC

(57) ABSTRACT

A method and system for rapidly preparing lithium carbonate or concentrated brine using high-temperature steam. The method comprises the steps of: feeding brine into a reactor, heating the brine with high-temperature steam above 200° C. while simultaneously discharging steam produced in the reactor, cooling and condensing the discharged steam in a condenser and collecting the condensate, and stopping the high-temperature steam after the brine is concentrated to a predetermined concentration or after a sufficient amount of lithium carbonate is collected. The system comprises: a reactor provided with a brine inlet, a steam outlet connected (Continued)

to a condenser, a product outlet, and a plurality of steam pipes. The method concerns the direct heating of brine using high-temperature steam, which is effective and efficient, and also produces fresh water. The heating is uniform and rapid, and does not require jackets, heat exchange tubes, mixers and vacuum pumps, vastly simplifying the system.

9 Claims, 1 Drawing Sheet

(51) Int. Cl.
*B01D 1/14* (2006.01)
*C02F 1/10* (2006.01)
*B01D 3/38* (2006.01)
*B01J 19/24* (2006.01)
*B01D 5/00* (2006.01)
*B01J 19/00* (2006.01)

(52) U.S. Cl.
CPC ....... *B01J 19/0013* (2013.01); *B01J 19/0053* (2013.01); *B01J 19/24* (2013.01); *C01D 3/06* (2013.01); *C02F 1/10* (2013.01); *B01J 2219/0013* (2013.01); *B01J 2219/00078* (2013.01); *B01J 2219/00094* (2013.01); *B01J 2219/00108* (2013.01); *B01J 2219/00123* (2013.01); *C01P 2006/80* (2013.01)

(58) Field of Classification Search
CPC .......... C02F 1/10; B01J 19/24; B01J 19/0013; B01J 19/0053; B01J 2219/00094; B01J 2219/00078; B01J 2219/00123; B01J 2219/00108; B01J 2219/0013; C01P 2006/80

See application file for complete search history.

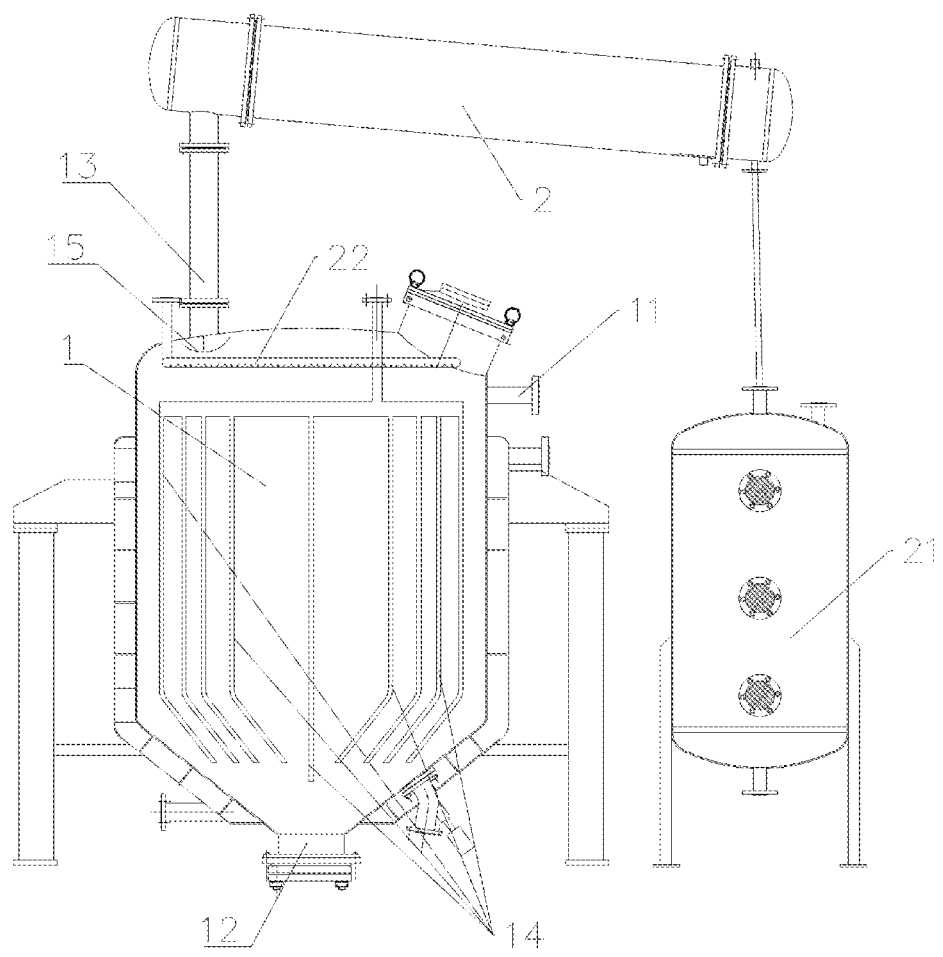

METHOD AND SYSTEM FOR RAPIDLY PREPARING LITHIUM CARBONATE OR CONCENTRATED BRINE USING HIGH-TEMPERATURE STEAM

TECHNICAL FIELD

This disclosure relates to a method and system for rapid preparation of lithium carbonate or concentration of brine, particularly, a method and system for rapid preparation of lithium carbonate or concentration of brine which is well adapted to high elevations.

BACKGROUND

As a metal with the smallest atomic weight, Lithium has such special properties as the most negative potential, the largest electrochemical equivalent, high specific heat capacity, high conductivity and chemical reactivity, and is the ideal metal material for manufacturing disposable and rechargeable power batteries and for structural material in aerospace applications. Global demand for new energy sources as an alternative to conventional fossil fuels (e.g. oil, coal and shale gas) is growing rapidly, and the lithium battery plays a pivotal role in the generation, transmission, transformation and storage of electric power based on new energy sources. Meanwhile, the worldwide short supply of a raw material of lithium-lithium carbonate has resulted in a dramatic increase in the transaction price of lithium carbonate from RMB 40,000 to RMB 160,000 in 2015 alone.

Lithium is a classic oligopolistic and strategic resource, the vast majority of which occurs in Chile, China, the Unites Stated, Argentina and Bolivia. Worldwide, China ranks second in terms of known lithium reserves. In the nature, the lithium mainly exists in salt lake brine, and, to a lesser extent, in spodumene and lepidolite. Salt lake lithium reserves account for more than 85% of China's industrial reserve.

Lithium and magnesium being diagonally adjacent in the periodic table and therefore chemically and physically similar to each other, they tend to occur together. Thus the separation process of magnesium from lithium has always been the foremost challenge in lithium extraction. Here is a review of several conventional Mg—Li separation methods: the ionic adsorption method is demanding on the adsorbent which is difficult to granulate and yields low performance in allowing the raw material to penetrate. During adsorption and desorption, the adsorbent degrades readily and the loss rate of lithium is over 50%; the calcination method operates at high temperatures, consumes substantial amounts of energy, causes severe clumping and corrosion to equipment; the extraction method involves lengthy extraction and reverse-phase (RP-) extraction processes, consumes massive quantities of reagents, has relatively high toxicity and is environmentally unfriendly. Consequently, although China is at an advantage in terms of lithium resources, mature industrial lithium extraction techniques that use salt lake brine as a raw material have either seen limited application only, or have been in a halt. In this context, the upstream and downstream industrial chains of the lithium face serious limitations, and China's renewable energy industries, such as the battery industry and the automotive industry have to bear the skyrocketing price of raw materials.

The conventional method of extracting lithium salt from salt lakes was mainly salt extraction under the sun, which is susceptible to weather conditions, has a long cycle of crystallization, produces products of low and inconsistent qualities, and does not meet the requirements of industrial production.

SUMMARY

The object of the present disclosure is to provide a method and system for rapidly preparing lithium carbonate or concentrated brine using high-temperature steam.

The technical solution adopted in the present disclosure is as follows.

A method for rapidly preparing lithium carbonate or concentrated brine using high-temperature steam comprising the following steps of:
1) feeding brine into a reactor;
2) introducing high-temperature steam with a temperature above 200° C. into the brine and heating the brine, while concurrently discharging steam produced in the reactor;
3) cooling the discharged steam using a condenser, and collecting the condensate;
4) stopping the introduction of the high-temperature steam after the brine is concentrated to a predetermined concentration or after a sufficient amount of lithium carbonate is separated out.

As a further improvement to the method above, the high-temperature steam is introduced into the brine after the brine is preheated to a temperature of not less than 50° C.

As a further improvement to the method above, the concentration of lithium ions in the brine is not less than 2 g/L.

As a further improvement to the method above, the high-temperature steam is superheated steam.

As a further improvement to the method above, the temperature of the high-temperature steam is not less than 250° C.

A system for rapidly preparing lithium carbonate or concentrated brine using high-temperature steam comprising:
a reactor, wherein the reactor is provided with
a brine inlet,
a plurality of steam pipes in the reactor, wherein openings of the steam pipes face downward,
a steam outlet which is arranged on the top surface of the reactor and connected to a condenser,
a product outlet which is arranged at the bottom of the reactor.

As a further improvement to the system above, the ends of the steam pipes are sloped. Further, the sloped ends of the steam pipes are arranged in a circle.

As a further improvement to the system above, the steam pipe is provided with a device for preventing suck-back. Further, the device used for preventing suck-back is a one-way valve.

As a further improvement to the system above, a mesh cover provided in the equipment and is arranged below the steam outlet.

As a further improvement to the system above, the condenser is provided with a condensate collector.

As a further improvement to the system above, the condensate collector is provided with a pipeline connected to a flusher in the reactor.

As a further improvement to the system above, a heater is arranged in the pipeline between the condensate collector and the flusher.

As a further improvement to the system above, the equipment comprises a cooling medium-containing jacket which is located outside the condenser. The cooling medium is brine.

The present disclosure has the beneficial effects as follows.

The method of the present disclosure which uses steams to heat the brine has the advantages of quickness and evenness of heating, which is beneficial in reducing the need for the heating devices like jackets and heat exchange pipes in the equipment, so as to avoid salt clumping caused by excessive temperature difference. In addition to heating the brine, the high-temperature steam acts to mix the brine, which is beneficial in that it eliminates the need for the installation of a mixer in the equipment. By condensing the steam through a heat exchanger, the generated steam can be automatically sucked out, which eliminates the need for a vacuum pump, and helps reduce the complexity of the equipment. The heat released by the steam condensation is recycled as much as possible, which can not only be used to heat the brine, but for preheating other mediums to make the process more energy-efficient. The concentration of the brine and the crystallization of lithium carbonate may be performed in different reactors, or in the same reactor, which offers flexibility and convenience of operation.

When being used to concentrate brine, the present disclosure has the advantage of quick and effective concentration, which can meet the demand for concentrated brine of continuous production in large quantities.

When the method according to the present disclosure is used for preparing lithium carbonate, the brine can be heated rapidly and boiled vigorously. In the process, large amounts of water evaporate, producing steam which decreases in volume rapidly after passing through the condenser, enabling the steam to be extracted quickly. In the process, the amount of the lithium carbonate separated far exceeds the amount of brine evaporated, which surprisingly surpasses expectations on the amount of lithium carbonate that can be separated. Meanwhile, the introduction of the steams also serves to mix the brine, which further simplifies the structure of the reactor, and saves on the investment in equipment.

The system according to the present disclosure has a simple structure, and can achieve the automatic discharge of the steam to a certain extent, as well as the self-mixing of the brine at the same time. Thus, the formation of salt crusts on the inner surfaces of the reactor can be effectively prevented, cutting the overall energy consumption and prolonging the lifetime of the equipment, which also makes this disclosure adaptable to high elevations.

The system according to the present disclosure not only can be used for concentrating brine, but can also be used for preparing lithium carbonate, and the purposes of the system can be conveniently adjusted according to circumstance, so as to satisfy the demands of different production conditions.

The system according to the present disclosure generates a large amount of water as a by-product in the process of preparing lithium carbonate or concentrated brine, which is especially suited to places of high elevations where fresh water is not in plentiful supply. The condenser preheats the brine while cooling the steam, making maximum use of thermal energy, and reducing heat discharge, and protecting the ecosystem of salt lake regions.

BRIEF DESCRIPTION OF THE DRAWINGS

FIG. 1 is a structural schematic diagram of the system according to the present disclosure.

DETAILED DESCRIPTION

A method for rapidly preparing lithium carbonate or concentrated brine using high-temperature steam comprising the following steps of:
1) feeding brine into a reactor;
2) heating the brine by introducing high-temperature steam of above 200° C., while concurrently discharging steam produced in the reactor;
3) cooling the discharged steam using a condenser and collecting the condensate;
4) stopping the introduction of the high-temperature steam after the brine is concentrated to a predetermined concentration or after a sufficient amount of lithium carbonate has been separated out. In order to avoid the introduction of excessive quantities of water when low-temperature brine is heated by the steam, and as a further improvement to the method above, the brine is treated with high-temperature steam after it has been preheated to a temperature of not less than 50° C. The higher the preheating temperature of the brine, the less the amount of high-temperature steam required for boiling the brine, and the more rapidly and intensely the brine will boil.

In the preparation of lithium carbonate, to ensure that the lithium carbonate can be separated more quickly during the heating process, a relatively higher concentration of lithium ions is favorable. As a further improvement to the method above, the concentration of lithium ions in the brine is not less than 2 g/L, and thus the whole cost is relatively low. When the method is used in the concentration of brine, there is no special requirement on the concentration of lithium ions in the brine, and the concentration can be conducted at as low a lithium ion concentration as 0.1 g/L.

The high-temperature steam described in the present disclosure includes both high-temperature steam and superheated steam. The amount of brine evaporated can be maximized and the amount of water introduced can be kept at a minimum if the temperature of the steam is higher, and as a further improvement to the method above, the temperature of the high-temperature steam should be not less than 250° C. But for consideration of economy, safety and the optionality of materials, steam temperatures ranging from 250° C. to 350° C. are advantageous for this disclosure.

As a further improvement to the method above, after the introduction of high-temperature steam is stopped when preparing the lithium carbonate, a constant temperature is maintained for at least one hour, which facilitates the full precipitation of the lithium carbonate, and meanwhile, the salt impurities therein is re-dissolved as much as possible, reducing the level of impurities in the final product.

The system according to the present disclosure is further described with reference to the drawings. With reference to FIG. 1, a system for rapidly preparing lithium carbonate or concentrated brine by using high-temperature steam comprises a reactor 1, wherein the reactor 1 is provided with a brine inlet 11, a steam outlet 13 is arranged on the top surface of the, and an outlet 12 is arranged at the bottom of the reactor; wherein a plurality of steam pipes 14, the openings of which face downward, are provided in the reactor 1, and the steam outlet 13 is connected to a condenser 2.

As a further improvement to the system above, the ends of the steam pipes are sloped. Further, the sloped ends of the steam pipes are arranged in a circle. In this way, the brine can be better agitated when the steam is introduced, ensuring optimal mixing.

As a further improvement to the system above, the steam pipe is provided with a device used for preventing suck-back. Further, the device used for preventing suck-back is a one-way valve. In this way, the suck-back can be effectively avoided, which further improves the safety of the equipment.

As a further improvement to the system above, a mesh cover 15 is arranged below the steam outlet 13. The function of the mesh cover is to prevent bubbles generated in the reactor from directly entering the steam outlet, which helps to keep the pipeline free of obstructions and thus increases the stability of the production process.

As a further improvement to the system above, the condenser 2 is provided with a condensate collector 21. In this way, the condensate can be effectively collected and further used, which greatly reduces the consumption of fresh water.

As a further improvement to the system above, the condensate collector 21 is provided with a pipeline connected to a flusher 22 in the reactor 1, and a heater is arranged in the pipeline between the condensate collector and the flusher. In this way, the condensate can be reheated conveniently to flush the reactor.

As a further improvement to the system above, a jacket containing a cooling medium is arranged outside the condenser. The cooling medium outside the condenser is brine. At high elevations, the brine temperature generally does not exceed 10° C., and the cooling result is very good. The temperature of the brine increases after it absorbs heat, and as a result, the energy required for preheating the brine is reduced. The cooling medium outside the condenser is not limited to brine. There is greater flexibility in the choice of cooling mediums in different circumstances. For example, fresh water may also be used as a cooling medium.

The technical solution of the present disclosure is further specified in the embodiments below.

The following embodiments and comparisons are all conducted in low-altitude regions, where the boiling point of water is about 100° C.

Embodiment 1

1) 3082 L (3822 kg) of brine A is pumped into a reactor and preheated to 80° C., wherein the brine A was rich in carbonate, and the concentration of lithium ions is 1.82 g/L;

2) superheated steam with a temperature above 250° C. was pumped into the brine in the reactor, and the steam generated was condensed through a condenser and naturally discharged, until the weight reading of the brine is at a steady 3481 kg after 19 min;

3) the temperature of the brine is reset to its initial value, the supernatant is discharged, the lithium carbonate crystals are transferred to a lower reactor and rinsed with purified condensed water, and wet white lithium carbonate that has a texture similar to that of ice cream is obtained;

4) the wet lithium carbonate is dried and 24.89 kg of solid lithium carbonate is obtained, where the grade is 95.2%, and the lithium separation rate is 79.4%.

Reference 1:

Compared with Embodiment 1, the difference is that jacket heating is employed, the temperature is kept at 90° C. for a total of 30 hours during which 340 kg of water evaporates, and after which the lithium carbonate crystals are filtered out and collected, whereby 5.48 kg of solid lithium carbonate is yielded at a grade of 81.9% and a separation rate of 15.0%.

Embodiment 2

1) 2216 L (2592 kg) of brine B was pumped into a reactor and preheated to 80° C., wherein the brine B is rich in carbonate, and the concentration of lithium ions is 2.55 g/L;

2) superheated steam at a temperature higher than 250° C. is pumped into the brine in the reactor for 15 min, until the weight of the brine reads 2343 kg steadily;

3) the temperature of the brine is reset to its initial value, the supernatant was discharged, the lithium carbonate crystals are transferred to a lower reactor and rinsed with purified condensed water, and wet white lithium carbonate that has a texture resembling that of ice cream is obtained; and 4) the wet lithium carbonate is dried to obtain 27.41 kg of solid lithium carbonate, whose grade is 99.47%, and the lithium separation rate is 90.7%.

Reference 2:

Compared with Embodiment 2, the difference is that jacket heating is used to maintain a constant temperature of 90° C. for 30 min, during which 250 kg of water is evaporated from the brine, after which lithium carbonate crystals are filtered out and collected, whereby 5.79 kg of solid lithium carbonate is yielded at a grade of 86.7% and a separation rate of 16.7%.

It is obvious from the comparisons between the embodiments and the references, that the high-temperature steam is introduced to enable the brine to boil intensely, which can drastically increase the separation rate of lithium carbonate far exceeding those separation rates attainable through conventional heating methods, and therefore, produces an unexpected effect.

Via the use of superheated steam in heating the brine, the lithium separation rate as well as the purity of lithium carbonate obtained in this way can be vastly improved. Thus, superheated steam is advantageous for this purpose.

Salt lakes are generally located at high elevations where water has a lower-than-usual boiling point between 75° C. and 80° C. Thus, better results can be obtained at high altitude areas, by evaporating massive amounts of water, with a lower energy consumption.

The preferred embodiments of the present disclosure are described in detail in the contents above, but the present disclosure is not limited to the embodiments, those skilled in the art can further make various equivalent modifications and replacements without departing from the nature of the present disclosure, and these equivalent modifications and replacements shall all fall within the scope limited by the claims of the application.

The invention claimed is:

1. A method for rapidly preparing lithium carbonate or concentrated brine using high-temperature steam comprising the following steps of:
   1) feeding brine into a reactor;
   2) introducing high-temperature steam with a temperature above 200° C. directly into the brine and heating the brine, while concurrently discharging steam produced in the reactor;
   3) cooling the discharged steam using a condenser, and collecting the condensate;

4) stopping the introduction of the high-temperature steam after the brine is concentrated to a predetermined concentration or after a sufficient amount of lithium carbonate is separated out.

2. The method according to claim 1, wherein the high-temperature steam is introduced into the brine after the brine is preheated to a temperature of not less than 50° C.

3. The method according to claim 1, wherein the high-temperature steam is superheated steam.

4. The method according to claim 1, wherein the temperature of the high-temperature steam is not less than 250° C.

5. The method according to claim 1, wherein after the introduction of high-temperature steam is stopped when preparing the lithium carbonate, a constant temperature is maintained for at least one hour.

6. A system for rapidly preparing lithium carbonate or concentrated brine using high-temperature steam comprising:

a reactor, wherein the reactor is provided with
  a brine inlet,
  a plurality of steam pipes in the reactor, wherein openings of the steam pipes face downward,
  a steam outlet which is arranged on the top surface of the reactor and connected to a condenser,
  a product outlet which is arranged at the bottom of the reactor,
  a condensate collector is provided with a pipeline connected to an irrigator in the reactor.

7. The system according to claim 6, wherein the ends of the steam pipes are sloped.

8. The system according to claim 6, wherein the condenser is provided with a condensate collector.

9. The system according to claim 6, wherein a cooling medium outside the condenser is brine.

* * * * *